US010372528B1

(12) United States Patent
Anderson et al.

(10) Patent No.: US 10,372,528 B1
(45) Date of Patent: Aug. 6, 2019

(54) RANDOM VALUES FROM DATA ERRORS

(71) Applicant: Seagate Technology LLC, Cupertino, CA (US)

(72) Inventors: William Erik Anderson, Longmont, CO (US); William A Paulsen, Lonsdale, MN (US)

(73) Assignee: Seagate Technology LLC, Cupertino, CA (US)

( * ) Notice: Subject to any disclaimer, the term of this patent is extended or adjusted under 35 U.S.C. 154(b) by 652 days.

(21) Appl. No.: 14/571,279

(22) Filed: Dec. 15, 2014

(51) Int. Cl.
*G06F 11/10* (2006.01)

(52) U.S. Cl.
CPC .................... *G06F 11/10* (2013.01)

(58) Field of Classification Search
CPC .. H04L 1/0057; H04L 1/0041; H03M 13/116; H03M 13/1111; H03M 13/1137; G06F 11/10
USPC ......................................................... 714/752
See application file for complete search history.

(56) References Cited

U.S. PATENT DOCUMENTS

| 4,571,546 A | 2/1986 | Wilkinson |
| 5,200,962 A * | 4/1993 | Kao ................ H03M 13/00 375/240 |
| 5,282,211 A | 1/1994 | Manlick et al. |
| 5,732,138 A | 3/1998 | Noll et al. |
| 6,061,820 A * | 5/2000 | Nakakita ........... H03M 13/2915 370/395.65 |
| 6,557,136 B1 * | 4/2003 | Friedmann ....... G11B 20/10009 714/752 |
| 6,931,425 B2 | 8/2005 | Xie et al. |
| 6,944,206 B1 | 9/2005 | Dent |
| 7,561,358 B2 | 7/2009 | Wang |
| 7,587,047 B2 | 9/2009 | Crandall et al. |
| 7,650,507 B2 | 1/2010 | Crandall et al. |
| 8,015,224 B1 | 9/2011 | Chaichanavong et al. |
| 8,130,955 B2 | 3/2012 | Trichina et al. |
| 8,361,307 B2 * | 1/2013 | Harding ................ C12Q 1/006 204/403.01 |
| 8,412,758 B2 | 4/2013 | Numminen |
| 8,566,377 B2 | 10/2013 | Harris et al. |
| 8,583,711 B2 | 11/2013 | Hars |
| 8,635,260 B2 | 1/2014 | Hars |
| 8,650,234 B2 | 2/2014 | Cho et al. |

(Continued)

OTHER PUBLICATIONS

Anderson, Random Values From Error Correcting Codes, U.S. Appl. No. 14/547,358, filed Nov. 19, 2014, 18 Pages.

(Continued)

*Primary Examiner* — Samir W Rizk
*Assistant Examiner* — Enam Ahmed
(74) *Attorney, Agent, or Firm* — Cesari & Reed, LLP; Kirk A. Cesari (57) ABSTRACT

Random values can be very beneficial in systems needing to generate random number or encryption keys. Systems and methods are presented herein that can generate a random value based on errors in data. For example, an error vector can be generated when data having errors (e.g. stored data, data received by a receiver, etc.) is compared with corresponding corrected data. A circuit, such as a data channel, can generate the corrected data by applying error correcting codes to the data with errors. One or more error vectors may be used to produce a random value. In some cases, multiple error vectors can be combined to produce a random value.

20 Claims, 5 Drawing Sheets

(56) References Cited

U.S. PATENT DOCUMENTS

| | | | |
|---|---|---|---|
| 8,856,199 B2 | 10/2014 | Tanamoto et al. | |
| 2003/0012372 A1* | 1/2003 | Cheng | H03M 13/2957 380/28 |
| 2004/0030979 A1* | 2/2004 | Shany | H03M 5/20 714/752 |
| 2004/0107398 A1* | 6/2004 | Johnson | H03M 13/09 714/758 |
| 2004/0131120 A1 | 7/2004 | Kim et al. | |
| 2004/0133836 A1* | 7/2004 | Williams | H03M 13/00 714/746 |
| 2004/0196974 A1* | 10/2004 | Shim | G11B 20/10 380/210 |
| 2004/0248549 A1 | 12/2004 | Drews | |
| 2005/0102598 A1* | 5/2005 | Shokrollahi | H03M 13/3761 714/752 |
| 2005/0175180 A1* | 8/2005 | Venkatesan | H04L 1/0057 380/268 |
| 2006/0215918 A1* | 9/2006 | Kimura | H04N 19/126 382/233 |
| 2009/0276683 A1* | 11/2009 | Toyoda | H03M 13/19 714/752 |
| 2010/0042906 A1* | 2/2010 | Gunnam | H03M 13/1111 714/780 |
| 2010/0195829 A1 | 8/2010 | Blom et al. | |
| 2012/0005560 A1* | 1/2012 | Steiner | H03M 13/09 714/780 |
| 2012/0198302 A1* | 8/2012 | Otterstedt | H03M 13/13 714/755 |
| 2012/0297271 A1* | 11/2012 | Sommer | G06F 11/1048 714/766 |
| 2013/0090903 A1 | 4/2013 | Dayka et al. | |
| 2014/0169092 A1* | 6/2014 | Miyamoto | G11C 16/26 365/185.09 |
| 2015/0007001 A1* | 1/2015 | Kern | H03M 13/152 714/785 |
| 2016/0018996 A1* | 1/2016 | Doumen | G06F 21/10 714/766 |
| 2016/0087654 A1* | 3/2016 | Anderson | H03M 13/3972 714/776 |

OTHER PUBLICATIONS

Anderson, Random Values From Data Errors, U.S. Appl. No. 14/591,765, filed Jan. 7, 2015, 24 Pages.

* cited by examiner

RANDOM VALUES FROM DATA ERRORS

SUMMARY

In some embodiments, an apparatus can include a circuit configured to receive input data and corrected data, the input data including data received as an input to an error correction operation and the corrected data including data provided as an output from the error correction operation. The circuit can also be configured to generate a random value based on the input data and the corrected data.

In some embodiments, a system can include a circuit having a first input, a second input, and an output. The circuit may be configured to generate an error vector by comparing received data received at the first input and corrected data received at the second input. The circuit can also be configured to store the error vector to the memory and calculate a random value based on the error vector.

In some embodiments, a method can include receiving input data and corrected data, the input data including data received as an input to an error correction operation and the corrected data including data provided as an output from the error correction operation. The method can also include generating an error vector by comparing the input data and the corrected data, then calculating a random value based on the error vector.

DETAILED DESCRIPTION

In the following detailed description of certain embodiments, reference is made to the accompanying drawings which form a part hereof, and in which are shown by way of illustrations. It is to be understood that the features and elements of the various described embodiments may be combined, other embodiments may be utilized, and structural changes may be made without departing from the scope of the present disclosure. It is also to be understood that features and elements of the various embodiments and examples herein can be combined, exchanged, or removed without departing from the scope of the present disclosure.

In accordance with various embodiments, the methods and functions described herein may be implemented as circuits or in firmware, or as one or more software programs running on a computer processor or controller, or any combination thereof. In accordance with some embodiments, the methods and functions described herein may be implemented as one or more software programs running on a computing device, such as a personal computer that is using a disc drive. Dedicated hardware implementations including, but not limited to, application specific integrated circuits, and other hardware devices can likewise be constructed to implement the methods and functions described herein. Further, the methods described herein may be implemented as a computer readable storage medium or memory device including instructions that when executed cause a processor or controller to perform the methods.

Examples are provided herein illustrating a system of generating random values based on errors in data. The random values may be used as a random number or seed data that can be provided to a random number generator, encryption circuit, or other circuits.

Random values may be used for data encryption, which may include the transformation of an input data sequence (e.g. plaintext) to an encrypted output data sequence (e.g. cipher text) using a selected encryption method (e.g. a cipher). Encryption circuits can include ciphers and can use one or more pieces of auxiliary data (e.g. encryption keys) to encrypt the plaintext by various encryption methods. The security of an encryption method can depend on the amount of entropy in the encryption keys; thus, the more entropy an encryption key has, the more secure the encryption method will be.

To help generate strong encryption keys, random number generators can be used. A random number generator can generate pseudorandom numbers based on a seed value received from a source of randomness. The strength of the pseudorandom numbers is dependent on the strength of the seed; thus, the more entropy the seed has the higher quality of randomness the random number generator can generate.

Examples are provided herein of random value generator circuits (which themselves could be random number generators) that can generate random values (or seeds) based on noise from electrical systems, where the noise can produce random errors in data. Noise in electrical systems can include distortion of signals or errors in data and may be caused by electromagnetic interference, radiation, or other environmental factors, as well as other factors. Noise may also be caused by errors due to the entropy (e.g. a measure of the randomness of errors in a transmitted signal or message) of a system. Entropy may be due to natural sources such as quantum mechanics (e.g. electric charges trapped in the oxide of the channel silicon), oxide thickness, Johnson-Nyquist noise (i.e. thermal noise), or other natural sources, and may be difficult to predict or replicate. Other sources of entropy can include system temperature variations (e.g. temperature swings due to writing data, the ability of the system to dissipate heat to its surrounding environment, etc.) writing a data cell and corrupting a neighboring cell(s), noise due to reading from or writing to a storage device, or other sources.

Randomness can cause errors by changing the value of a signal in unpredictable ways. In digital systems, logic high values (1s) can be represented by a signal voltage at or above a first threshold, and logic low values (e.g. 0s) can be represented by a signal voltage at or below a second threshold. For example, in some five volt transistor-transistor logic (TTL) systems, a logic low may be determined from a voltage at or below 0.8 volts, and a logic high may be determined from a voltage between 2.2 volts and 5 volts. A random error may change the voltage of the signal. When the signal errors do not change the logic value of the data, they may go unnoticed or may be ignored. In some cases, voltage changes due to random errors may be large enough to change the logic state of the data (e.g. high to low or vice versa), or from a valid logic state to an undetermined state. For example, noise can change a voltage from 0.6 volts (logic low) to 1.7 volts (undetermined). When a signal voltage is in an undetermined range, the data may be unreliable.

Some data storage devices, such as solid state data storage devices, may have a limited number of physical sources from which to derive entropy. One of those sources may be a data channel. As data is transmitted or received by a data channel, such as by reading or writing to a data storage medium (e.g. flash memory or disc memory) or other transmitting or receiving of data, data errors may occur, which may have random error rates conducive to generating strong encryption keys for data security. As described herein, examples are provided that can generate a seed based on errors in a data channel.

Error correction circuits and functions, including error correction code(s) (ECC) such as low-density parity check (LDPC) codes or other codes, can be used to correct data errors in received data. The input and output of the ECC operation can be used to generate random values. In some embodiments, a system can calculate a random value based on an error vector generated when corrected data is compared with corresponding received data. The error vector may be stored in a memory and can be used to form, or as, a seed or random value. As described herein, examples are provided that can generate a seed using error vectors from comparison operations.

Figure 1:
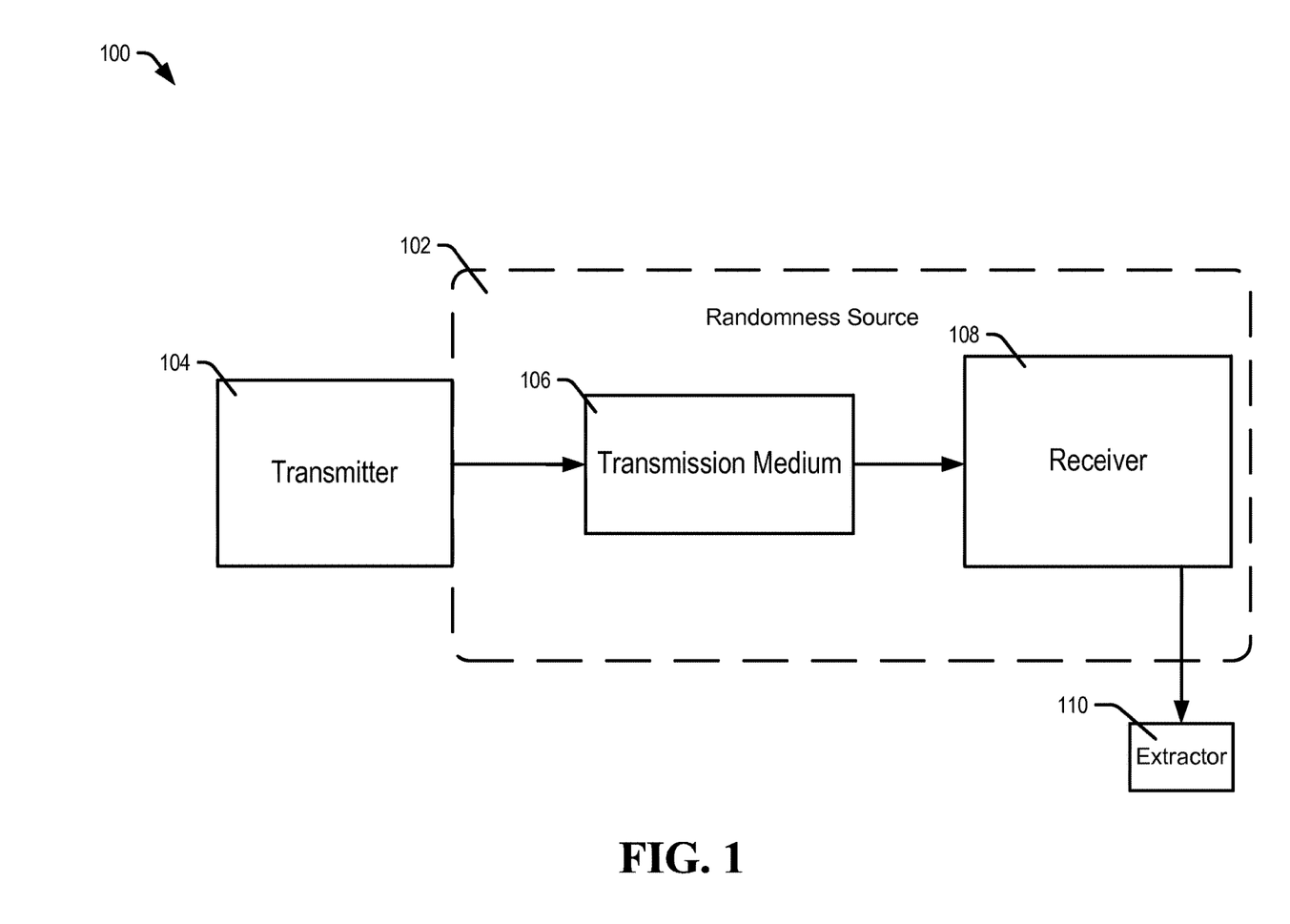
FIG. 1 is a diagram of a system configured to calculate random values from data errors, in accordance with certain embodiments of the present disclosure.

Referring to FIG. 1, a system configured to calculate random values from data errors is shown and generally designated 100. System 100 can include a randomness source 102, which may be any part of a data channel which can introduce errors into the transmitted data, such as a transmission medium 106 or receiver 108. The data channel may also include a transmitter 104.

In some embodiments, the transmitter 104 may be an antenna, transducer, transceiver, sensor, laser, or other device capable of transmitting data to the receiver 108 via the transmission medium 106. The transmission medium 106 may be a data storage medium, wireless medium, other medium, or any combination thereof. The receiver circuit 108 may be an antenna, transceiver, transducer, sensor, detector, or other device capable of receiving data from the transmission medium 106. In some embodiments, the randomness source 102 may be a data channel.

An extractor circuit 110 may be coupled to the data channel; for example, such may be coupled to the receiver 108. The extractor circuit 110 may be an application specific integrated circuit (ASIC), field programmable gate array (FPGA), hardware logic, or other circuit. In some cases, the extractor circuit 110 may be a processor or controller configured to execute instructions stored in a memory, such as firmware or software, and so forth.

During operation, the transmitter 104 may transmit a signal to the receiver 108. Noise in the randomness source 102 can cause random errors in the signal received at the receiver 108. For example, electrical storms can add random noise to amplitude modulated (AM) and frequency modulated (FM) radio signals, solar flares can interfere with satellite communications, and quantum effects can cause random errors to occur to data stored to a memory. Noise can also occur in computer chips due to overheating or other factors. Data errors may cause changes to data already stored to a memory. In some examples, data errors corresponding to the data stored in a memory may be included in the randomness source 102.

The extractor circuit 110 can extract random errors from the signal received by the receiver 108 by comparing the received signal (received data) to a reference signal. In some cases, the reference signal may be an error corrected version of the received signal; such as can be accomplished using ECC data corresponding to the received data. The resulting compared data may be provided as a random value to random number generator(s), encryption circuit(s), controller(s), other circuit(s), or any combination thereof.

Figure 2:
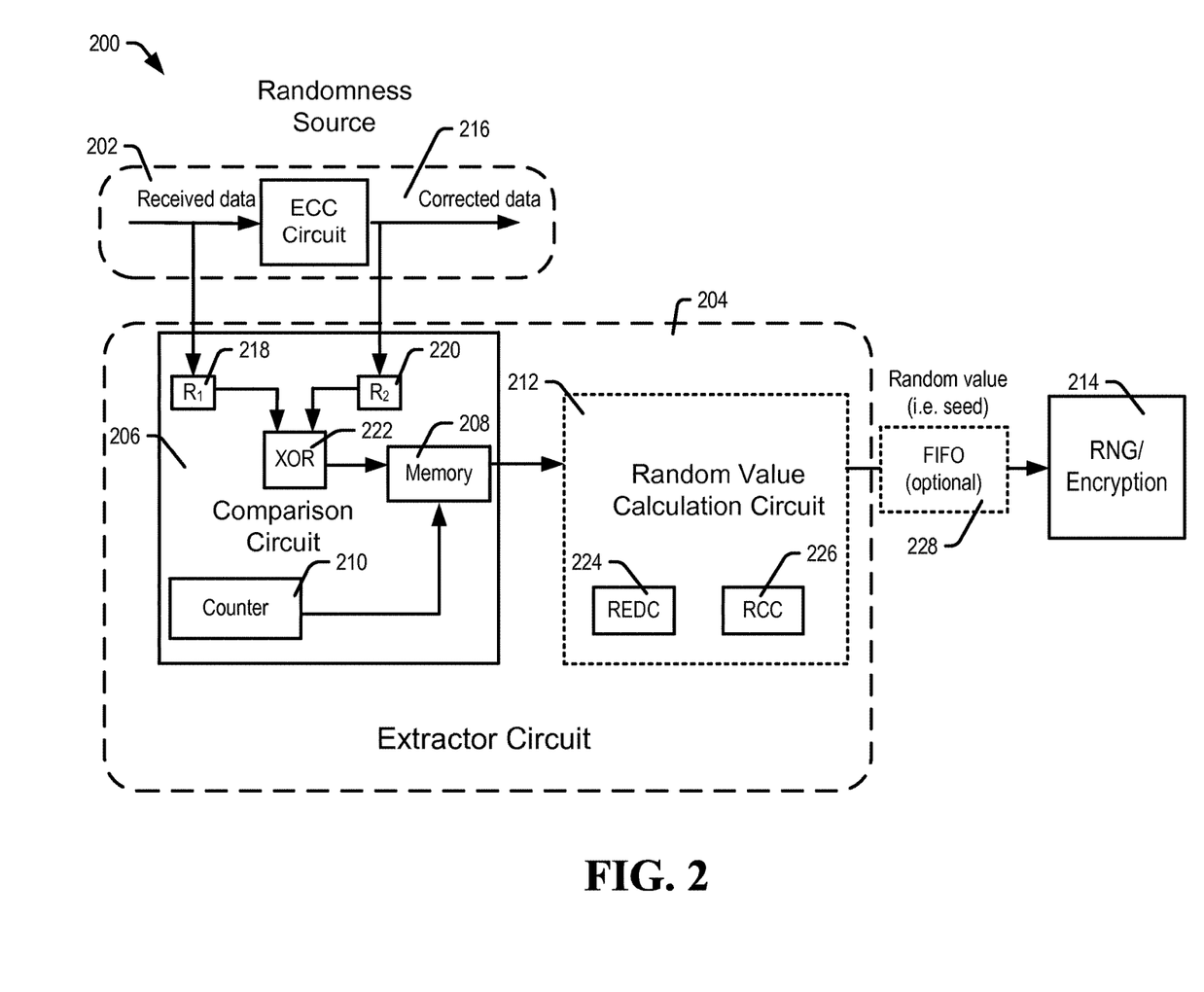
FIG. 2 is a diagram of a system configured to calculate random values from data errors, in accordance with certain embodiments of the present disclosure.

Referring to FIG. 2, a system configured to calculate random values from data errors is shown and generally designated 200. System 200 is an example of system 100 according to certain embodiments. System 200 can have a randomness source 202, which may be the randomness source 102, and an extractor circuit 204. The extractor circuit 204 may be coupled to the randomness source 202 to allow receiving of signals with errors. An output of the extractor circuit 204, which may be the extractor circuit 110, may also be coupled to a random number generator (RNG) 214 or an encryption circuit. In some embodiments, an output of the extractor circuit 204 may optionally be coupled to a memory 228, first-in first-out (FIFO) buffer circuit.

The randomness source 202 may be any source that generates noise or causes data errors in a signal. For example, a transmitter, transmission medium, or receiver may be a randomness source, separately, together, or in any combination. The randomness source 202 of system 200 can include an error correcting (ECC) circuit 216.

The extractor circuit 204 can have a comparison circuit 206 and an optional random value calculation circuit (RVCC) 212. The comparison circuit 206 can include a counter circuit 210, memory 208, first register(s) ($R_1$) 218, second register(s) ($R_2$) 220, and a combiner circuit 222. The RVCC 212 can include a randomness calculation circuit (RCC) 224, and may include a recurring error detection circuit (REDC) 226. In some embodiments, the RCC 224 and the REDC 226 may be stand alone, included in the comparison circuit 206, or included in other circuits.

The comparison circuit 206 may be an ASIC, FPGA, part of a system on chip (SOC), integrated with the RVCC 212, or other circuit. In some cases, the comparison circuit 206 may be a processor executing instructions stored in a memory, such as firmware or software, and so forth. The RVCC 212 may be an ASIC, FPGA, SOC, integrated with the comparison circuit 206, or another circuit. In some cases, the RVCC 212 may be a processor executing instructions stored in a memory, executable software, and so forth. The memory 208 may be a volatile or non-volatile solid state memory such as dynamic random access memory (DRAM), flash memory, spin-torque transfer random access memory (STRAM), resistive random access memory (RRAM), ferromagnetic random access memory (FRAM), and so forth. In some cases, the memory 208 may be a first in first out (FIFO) buffer circuit, shift register, or similar device.

During operation, the extractor circuit 204 may be coupled to receive data from the input of the ECC circuit 216 and also receive data from the output of the ECC circuit 216. The ECC circuit 216 may be able to detect and correct data errors in received data by processing a data correction operation, which may be based on error correcting codes received as part of the received data.

In some embodiments, the received data and corrected data may be stored in a memory, which may or may not be located in the extractor circuit 204. The extractor circuit 204 can then generate a random value based on the stored received data and corrected data.

The comparison circuit 206 can compare the received data and corrected data to produce an error vector. The comparison circuit 206 can store the received data to $R_1$ 218, and corresponding corrected data to $R_2$ 220. In some embodiments, $R_1$ 218 and $R_2$ 220 may be memory devices, such as DRAM. The combiner circuit 222 can compare the received data and corrected data to generate an error vector. In some embodiments, the combiner circuit 222 may include an exclusive-or (XOR) operation that combines the received data and the corrected data to generate the error vector. In an example, an eight-bit word of received data (10110010) may have a bit error at the second bit and seventh bit; thus, the corresponding corrected data would be 11110000. If the combiner circuit 222 is configured with an XOR operation, the error vector could then be generated by 10110010 XOR 11110000 to result in 01000010 as the error vector.

The comparison circuit 206 may generate the error vector for all of the received data and corresponding corrected data, or for any portion of the received data and corresponding corrected data. For example, when the ECC circuit 216 corrects data on a per page basis for a flash memory device, the comparison circuit 206 may generate an error vector based on a whole page or a portion less than all of the whole page. For example, a page of data may be divided into multiple codewords that have a complete set of parity data used to perform the error correction. The data path can transfer a segment of a page corresponding to a whole number of codewords to a processing circuit. The processing circuit can then operate on only those codewords to generate a corresponding error vector. The corresponding error vector will then be derived from a subpage unit of data. Reducing the size of the error vectors may reduce the amount of memory and processing required to generate and store the error vectors.

The comparison circuit 206 can store the error vector to the memory 208. The memory 208 can be configured to store a number "N" of error vectors. The number of error vectors may affect a level of randomness (E), including a minimum level of randomness, ($E_{MIN}$), extracted from the randomness source 202. In some systems, randomness distributions may become more irregular as the number of error vectors increases, thus increasing the randomness of the random value calculated by the RVCC 212.

In some embodiments, a threshold number of error vectors may be stored in the memory 208 and may be pre-determined during product manufacture or design. In some embodiments, the threshold number may be changed on-the-fly, in real-time, to adapt to changing randomness requirements, changes in the noise characteristics of the randomness source 202, other changes, or any combination thereof.

In some embodiments, a counter circuit 210 can count the error vectors in the memory 208 and store a count of error vectors to the memory 208 (or other memory). The counter circuit 210 may count the error vectors as they are generated. The count can increase each time an error vector is stored to the memory 208. When the count reaches a threshold number "N", the RVCC 212 can calculate the random value by processing the N error vectors. In some cases, the RVCC 212 can calculate the random value by concatenating, adding, dividing, multiplying, or squaring the error vectors (or any combination thereof). Further, the RVCC 212 can combine the error vectors with other numbers, input them into logic circuits (e.g. AND, OR, XOR, etc.), or use other functions to calculate the random value. The RVCC 212 may provide the random value to the RNG 214 via an output. In some examples, the RVCC 212 may provide the random value to the memory 228, which can provide the random value to the RNG 214 upon request. In some embodiments, the memory 208 can provide one or more error vector(s) directly to the RNG 214 as the random value.

In some embodiments, the extractor circuit 204 may be configured to generate a random value only when a certain number of errors are detected, which may be determined by the error detector of the ECC 216. In some embodiments, the RCC 224 may discard data or error vectors that do not have at least a threshold number of data errors. Further, in some examples, the extractor circuit 204 may be configured to generate a random value only when there is a pre-determined amount of randomness in the error vectors. RVCC 212 may determine when a same error vector occurs too frequently or consecutively. The REDC 226 can monitor the error vectors to determine which, if any, of the error vectors recurs or how often error vectors occur, and may discard some or all of the recurring error vectors if the number of recurring error vectors is too high; for example, the REDC 226 may look for recurring patterns in error vectors, such as determining whether a same error vector occurs successively, occurs multiple times within a number of error vectors, occurs too often (e.g. count of an error vector within a time period or in the memory), or any combination thereof.

In some embodiments, any combination of the RVCC 212, the RCC 224, and REDC 226 may be included in the comparison circuit 206 or may be independent, separate circuits. The RCC 224 and REDC 226 may be used to analyze the error vectors before they are in the memory 208, when the error vectors are in the memory 208, or when the error vectors are output from the memory 208. For example, the REDC 226 and RCC 224 may receive the error vectors from the combiner circuit 222, and discard unwanted error vectors before they are stored to the memory 208. The RCC 224 and RVCC 212 may operate independently of each other, be implemented in different locations, or not included in the extractor circuit 204. In some cases, only one of the REDC 226 or RVCC 212 may be included in the system 200.

The examples shown in FIG. 2 depict a system configured to store one or more error vectors to the memory 208, and then provide the error vector(s) to the RVCC 212. In some embodiments, the RVCC 212 may be omitted from the extractor circuit 212, and any of the functions performed by the RVCC 212 may be implemented at the comparison circuit 206. In some examples, the memory 208 may be configured to store just one error vector, which may be provided to the RVCC 212 upon detection of a trigger, expiration of a timer, and so forth.

Figure 3:
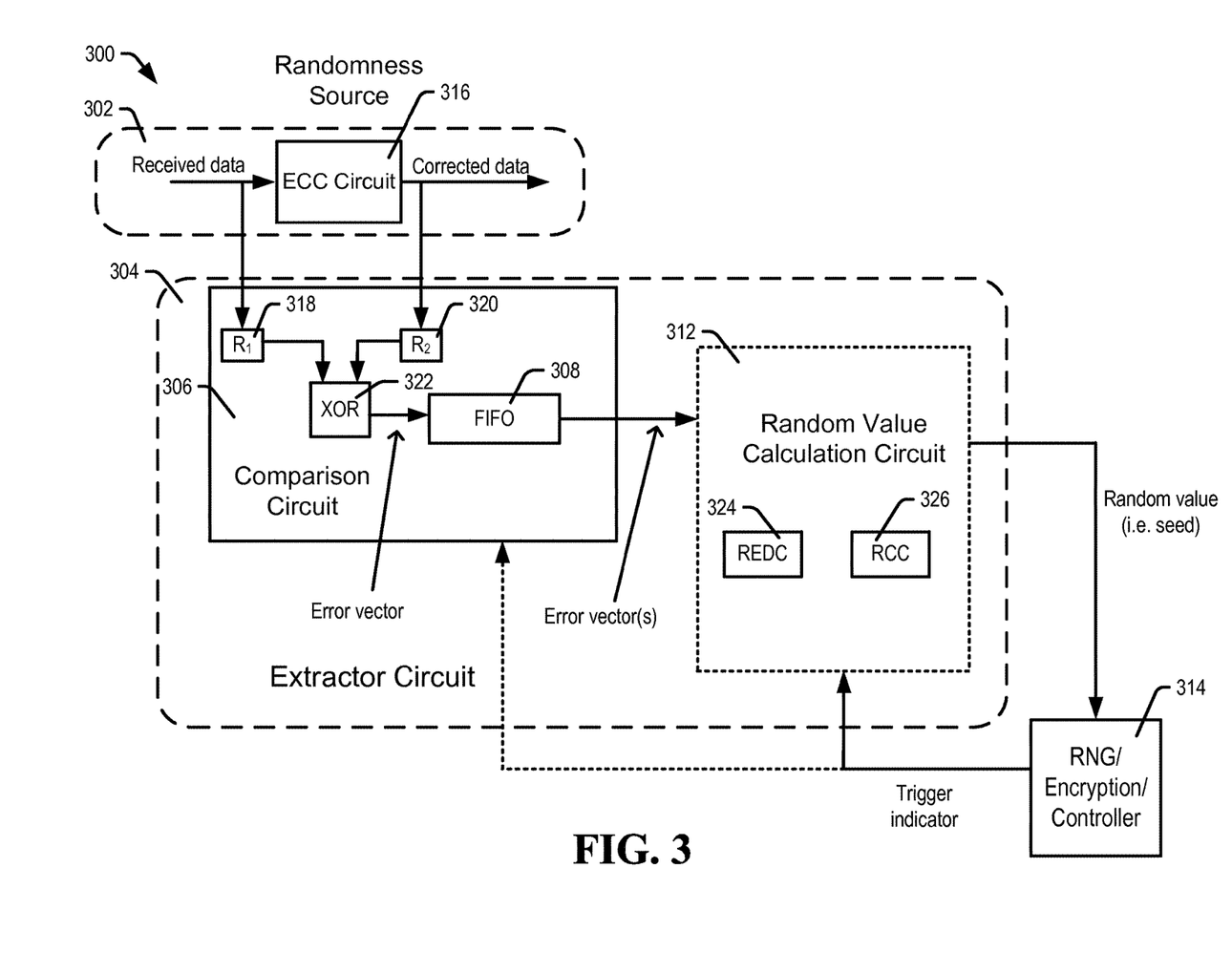
FIG. 3 is a diagram of a system configured to calculate random values from data errors, in accordance with certain embodiments of the present disclosure.

Referring to FIG. 3, a system configured to calculate random values from data errors is shown and generally designated 300. System 300 is an example of system 100, according to certain embodiments. The systems and functions of FIGS. 2 and 3 can be combined with each other or any other system or function described herein. System 300 can have a randomness source 302 and an extractor circuit 304. The extractor circuit 304 may be coupled to the randomness source 302 to allow receiving of signals with errors.

The extractor circuit 304 can have a comparison circuit 306 and an optional random value calculation circuit (RVCC) 312. The comparison circuit 306 can include a memory 308, first register(s) ($R_1$) 318, second register(s) ($R_2$) 320, and combiner circuit 322. The RVCC 312 can include a randomness calculation circuit (RCC) 324 and a recurring error detection circuit (REDC) 326. In some embodiments, the RCC 324 and REDC 326 may be independent, included in the comparison circuit 306, or included in other circuits.

During operation, the extractor circuit 304 may receive received data from the input of the ECC circuit 316 and corrected data from the output of the ECC circuit 316. When data errors in the received data are detected, the ECC circuit 316 may be able to correct the data errors in the received data by processing a data correction operation to generate corrected data.

The comparison circuit 306 can compare the input data and the corrected data to produce an error vector 323. The comparison circuit 306 may store the received data to $R_1$ 318, and the corresponding corrected data to $R_2$ 320. The combiner circuit 322, which may be an exclusive-or (XOR) circuit or function, can combine the received data and corrected data to generate an error vector.

The error vector may be stored in the memory 308, which may be a first-in first-out (FIFO) buffer configured to store multiple error vectors. The memory 308 can continually store error vectors as they are generated by the combiner circuit 322, and upon request or other trigger, provide the error vectors to the RVCC 312.

In some embodiments, such as when a random value is requested, the extractor circuit 304 may check the memory 308 to determine if a minimum number of error vectors exist within the memory 308 to generate a random value with a desired level of randomness. When a threshold number of error vectors are stored in the memory 308, the RVCC 312 can receive the error vectors out of the memory 308 and calculate the random value. When a minimum number of error vectors are not in the memory 308, the extractor circuit 304 may delay generating a random value until the minimum number is met, or could provide an error flag.

The RVCC 312 can calculate the random value by processing the error vectors, such as concatenating, adding, dividing, multiplying, or squaring the error vectors, or any combination thereof. Further, the RVCC 312 may combine the error vectors with other numbers, input them into logic circuits (e.g. AND, OR, XOR, etc.), or use other functions to calculate the random value. The RVCC 312 may provide the random value to the circuit 314 via an output of the extractor circuit. However, in some instances, one or more error vectors may be directly provided as the random value.

In some examples, the circuit 314 may be a RNG, an encryption circuit, a controller, or other circuit, and may be configured to request a random value from the extractor circuit 304. The circuit 314 may provide a trigger indicator to the extractor circuit 304 to indicate that a random value is needed. In some cases, the circuit 314 may provide the trigger indicator to the comparison circuit 306 or the RVCC 312. When the trigger indicator is detected at the extractor circuit 304, the extractor circuit 304 may output the error vectors in the memory 308, and may also process them via the functions of the RVCC 312, REDC 324, RCC 326, or may provide the error vectors directly as the random value output.

The circuit 314 may require a random value having a minimum level of randomness. Such a level of randomness may correspond to the variations of error vectors or a set of error vectors. In some embodiments, the RCC 326 can check to determine when the error vectors from memory 308 have a minimum threshold of randomness. When the error vectors are determined not to have a minimum threshold of randomness, the RCC 326 can discard one or more or all of the error vectors.

In some cases, the level of randomness may correspond to a number of recurring errors in an error vector, or to a number of recurring error vectors. The REDC 324 can determine when a data error(s) occurs more than once in an error vector, or an error vector recurs more than once for a pre-determined number of processed error vectors. In some examples, the REDC 324 may discard an error vector if the error vector is recurring too often. In some embodiments, the REDC 324 may monitor the number of errors in the received data and discard error vectors if there is not a minimum number of errors in the original received data.

In some embodiments, the RVCC 312, RCC 322, and REDC 324 may be included in the comparison circuit 306. In some examples, the REDC 324 or RVCC 312 may receive error vectors from the combiner circuit 322 and discard unwanted error vectors before they are stored to the memory 308. The REDC 324 and RVCC 312 may operate independently of each other, be implemented in different locations, or not be included in the extractor circuit 304. Any combination of the functions of the RCC 322, REDC 324, and RVCC 312 may be included in the extractor circuit 304.

Figure 4:
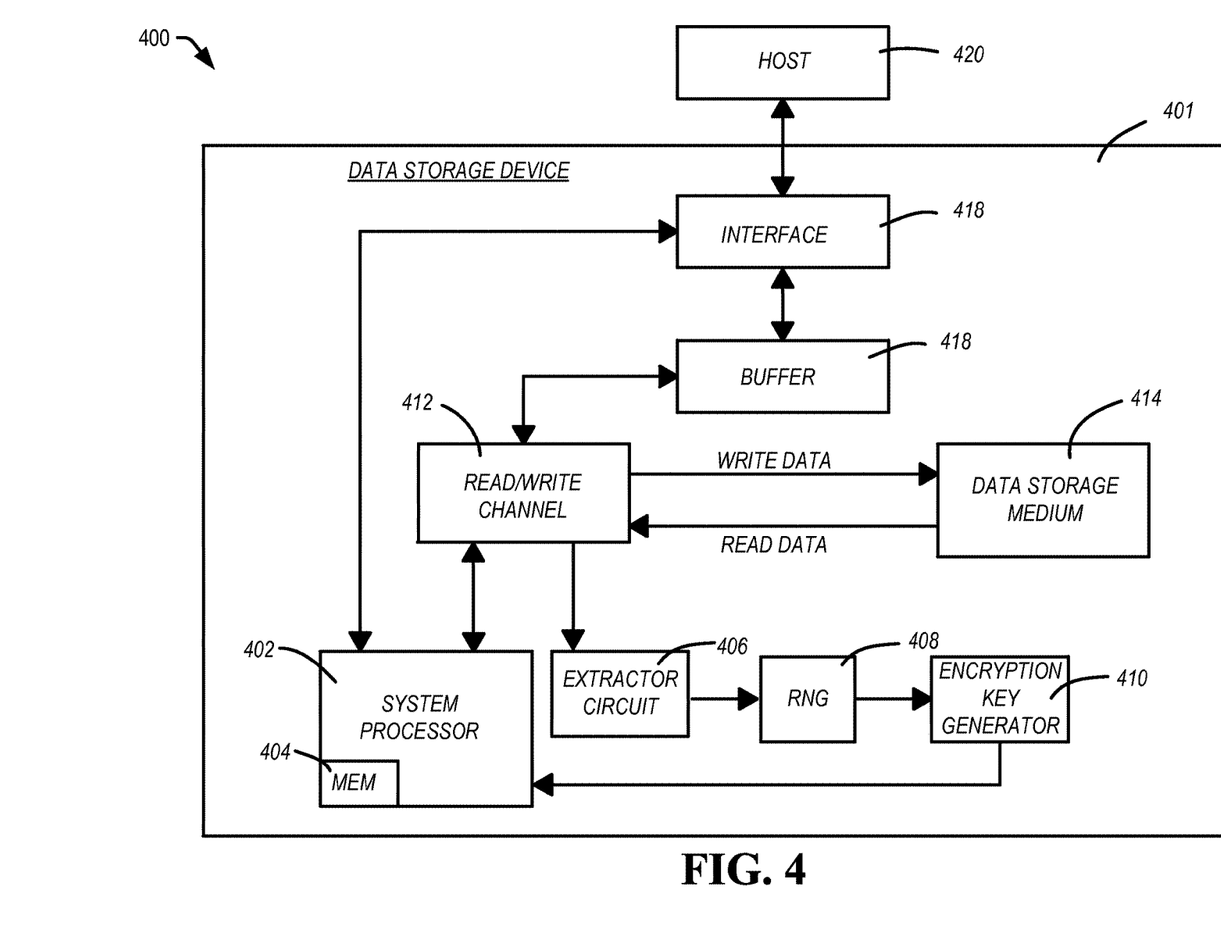
FIG. 4 is a diagram of a system configured to calculate random values from data errors, in accordance with certain embodiments of the present disclosure.

Referring to FIG. 4, a system configured to calculate random values from data errors is shown and generally designated 400. The system 400 can be an example of a data storage device (DSD), and is an example of systems 100, 200, and 300 according to certain embodiments. The DSD 401 can optionally connect to be removable from a host device 420. The data storage device 401 can communicate with the host device 420 via the hardware/firmware based host interface circuit 418 that may include a connector that allows the DSD 401 to be physically connected and disconnected from the host 420.

The DSD 401 can include a system processor 402, which may be a programmable controller, and associated memory 404. The system processor 402 may be part of a system on chip (SOC). A memory 416 may temporarily store data for read and write operations, and can include a command queue. The read-write (R/W) channel 412 can encode data during write operations to, and decode data during read operations from, the data storage medium 414. The R/W channel 412 may include a source of randomness, such as the randomness sources discussed herein.

The DSD 401 may include an extractor circuit 406 coupled to the R/W channel 412 and the random number generator (RNG) 408. When read data is received at the R/W channel 412, the extractor circuit 406 can compare the received data with error corrected data to generate a random value. One of the ways the random value can be generated is by determining an error vector between the corrected data and the received data. One or more error vectors can be stored in a memory until a trigger, such as a threshold count or request, indicates a random value is needed. In some embodiments, the extractor circuit 406 may additionally process the error vector(s), such as to provide additional randomness, before outputting the random value to the RNG 408.

In some embodiments, the random value can be used for random number generation, encryption key generation, other security functions, or any combination thereof. For example, the extractor circuit 406 can provide the random value to the RNG 408, which can generate a random number based on the random value and provide the random number to the encryption key generator 410. The encryption key generator 410 can generate one or more encryption key(s) based on the random number and provide the encryption key(s) to the system processor 402 or other encryption circuit, which may use the encryption key(s) to encrypt data for storage on the data storage medium 414, transmission to the host 420, or for other purposes.

Figure 5:
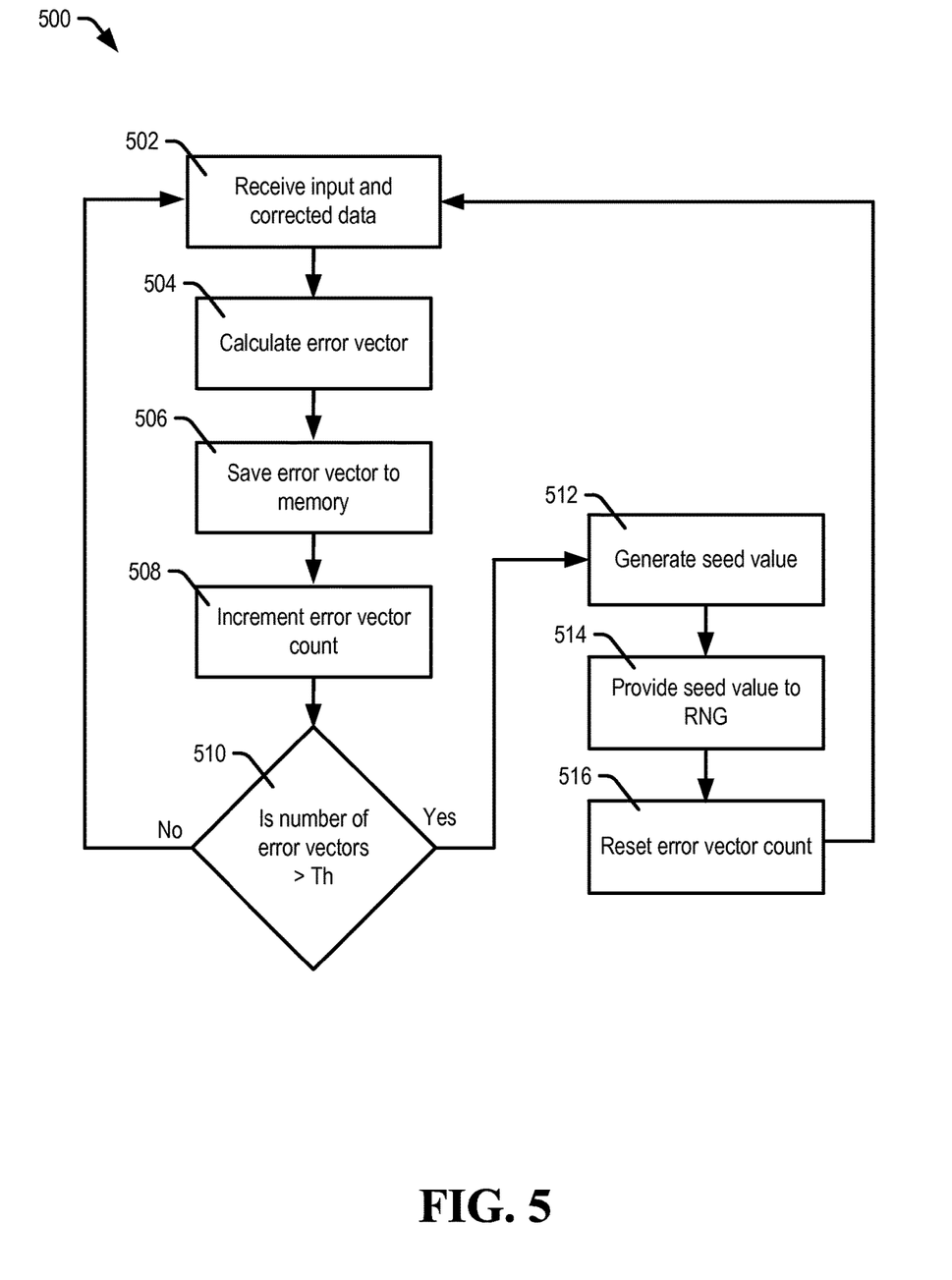
FIG. 5 is a flowchart of a method of calculating random values from data errors, in accordance with certain embodiments of the present disclosure.

Referring to FIG. 5, a flowchart of a method of calculating random values from data errors is shown and generally designated 500, in accordance with certain embodiments. The method 500 can be implemented by the systems 100, 200, 300, or 400 described above. The method 500 can include receiving input data and corresponding corrected data, at 502. The input data can be data received by a receiver, such as via a transmission medium, and the corrected data may be data corrected by an ECC circuit or other circuit with error correction capabilities.

The method 500 can include calculating an error vector based on the received data and the corrected data, at 504. In some examples, a combiner can calculate the error vector by XOR-ing the received data and the corrected data to calculate the error vector. In other examples, the random value may be calculated by combining the received data and the corrected data via other operations, such as addition, subtraction, convolution, a combination of operations, other operations, or any combination thereof.

After an error vector is calculated, it may be saved to a memory, at 506. For example, a combiner circuit can store the error vector to a memory, such as a FIFO, which may be a volatile or non-volatile memory. The method 500 may continually calculate error vectors via repeating the above steps, at 502, 504, and 506. Multiple error vectors may be stored in a memory, such as a FIFO buffer.

At this point, in some embodiments, the error vector(s) may be stored in memory (e.g. the most recent error vectors in a FIFO) until a request (e.g. an operation, instruction, input line indicator, or other indicator) is received to produce a random value, at 509. The memory may act as a FIFO buffer to provide a memory space to store error vectors, which can allow the system to generate more error vectors than can fit at any one time in the allocated memory space because the FIFO can only store a certain number of the most recent error vectors. When a request is received, which may come from a random number generator, controller, encryption circuit, or other device, the error vectors may be output from the memory and the random value may be determined based on the error vectors, at 512. In some examples, the error vectors may be output from the memory even if a threshold number of error vectors are not stored and the method 500 may generate a random value based on the error vector(s), at 512, and provide the random value to a RNG or other device, at 514.

Further, in some embodiments, the random value(s) may be calculated automatically. For example, when the error vector is saved to a memory, an optional error vector count may be incremented, at 508. A counter circuit, or other circuit, can keep a count of how many error vectors are stored in the memory and can automatically proceed to generating and outputting the random value when the threshold is met, at 512 and 514.

In some embodiments, a threshold number of error vectors may be required in order to generate a random value having a minimum level of randomness. For example, the method 500 can include determining if a threshold number of error vectors are stored, at 510. This can be determined whether the random value is calculated automatically per the threshold or on request. When a threshold number of error vectors are stored, the method 500 can include generating a random value, at 512. In some examples, a circuit can combine the error vectors by concatenation or another method. When a threshold number of error vectors is not stored, at 510, the method 500 can determine, at 515, if it should delay generation of a random value until the threshold is met or return an error indicator that random value is not available, at 517. The delay may be determined based on an available amount of time the system has to generate the random value, a priority indicator of whether a delay is acceptable, a setting of a system implementing the random value generation method 500, a setting of a system requesting the random value generation method 500, another basis, or any combination thereof.

The method 500 can include providing the random value at an output, at 514. In some embodiments, the random value may be provided to a random number generator, an encryption circuit, a controller, or a memory (e.g. a FIFO buffer).

If a count of error vectors is implemented, it may be reset, at 516, after the system outputs the random value, hits a certain count, or due to another trigger. In some embodiments, when the counter circuit is reset, the error vectors in the memory may be erased or invalidated, though such could be accomplished earlier based on outputting the random value, based on an error vector being used to generate a random value, or based on a timer, or any combination thereof.

In some embodiments, the method 500 may include determining if a threshold level of randomness has been met (i.e. whether the entropy level is high enough). For example, the number of data errors represented in an error vector may be too low. When the number of data errors in an error vector is too low, the error vector may be discarded. Further, error vectors can be checked to determine if any of the error vectors have non-random, or recurring, data strings. A randomness check function can be included to determine if an error vector(s) is occurring too many times or too frequently. In some embodiments, the error vectors that occur too many times or too frequently may be discarded. These and other checks on randomness could be implemented prior to storing error vectors in the memory or after they are stored in the memory, such as when the random value is to be calculated. Further, similar randomness checks can be implemented to check the random value prior to being output or after the random value is output.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:
1. An apparatus comprising:
a circuit configured to:
 receive, at a data channel, input data;
 apply, at the data channel, an error correction operation to the input data to produce corrected data, the corrected data being a corrected version of the input data output from the error correction operation;

generate a random value using the input data and the corrected data as a source of entropy; and generate a random number based on the random value.

2. The apparatus of claim 1 comprising the circuit further configured to:

generate the random value by calculating an error vector from the input data and the corrected data; and store the error vector to a memory.

3. The apparatus of claim 2 comprising the circuit further configured to:

calculate a threshold number "N" of error vectors by comparing N iterations of input data with associated corrected data; and store the N error vectors to the memory.

4. The apparatus of claim 3 comprising the circuit further configured to:

count a number of error vectors and store the count of error vectors to the memory; and calculate the random value automatically when the count of error vectors exceeds a threshold.

5. The apparatus of claim 2 comprising the circuit further configured to:

calculate the random value based on the N error vectors.

6. The apparatus of claim 1 comprising the circuit further configured to:

determine if the input data has at least a threshold number of data errors; and discard the input data and generate the random value based on the input data when the input data does not exceed the threshold number of data errors.

7. The apparatus of claim 1 comprising the circuit further configured to:

determine if an error vector recurs within a pre-determined number of error vectors; and discard the error vector when it does recur within the pre-determined number or error vectors.

8. The apparatus of claim 1 comprising the circuit further configured to:

determine if the error vector has a threshold level of randomness; and discard the error vector when the error vector does not have the threshold level of randomness.

9. A system comprising:

a memory;

an extractor circuit having a first input, a second input, and an output, configured to:

generate an error vector by comparing received data received at the first input as an input to an error correction operation and reference data output from the error correction operation and received at the second input;

store the error vectors to the memory; and determine a random value using the error vector as a source of entropy; and a data channel configured to receive the received data at a third input, apply the error correction operation to the received data to produce the reference data at a second output, the reference data being a corrected version of the received data.

10. The system of claim 9 further comprising:

a first register coupled to the first input, the first register configured to store the received data;

a second register coupled to the second input, the second register configured to store the reference data; and the extractor circuit includes an exclusive-or operation configured to generate the error vector by comparing the received data in the first register and the reference data in the second register.

11. The system of claim 10 further comprising:

a counter circuit configured to count a number of error vectors; and the extractor circuit is configured to calculate the random value when the number of error vectors exceeds a threshold.

12. The system of claim 10 further comprising:

the extractor circuit includes a detector circuit configured to detect when an error vector is generated more than a threshold number of times, and discard the error vector when the error vector is generated more than the threshold number of times.

13. The system of claim 10 further comprising:

the extractor circuit includes a detector circuit configured to determine when the received data has at least a threshold level of randomness, and discard the received data when the received data does not have the threshold level of randomness.

14. The system of claim 10 further comprising:

a random number generator coupled to the extractor circuit and configured to generate a random number based on the random value.

15. The system of claim 14 further comprising:

a processor;

the data channel operably coupled to the processor;

the first input of the extractor circuit coupled to the third input of the data channel and the second output coupled to the second input; and the processor configured to manage data operations received via the data channel.

16. The system of claim 9 further comprising:

the memory is a first-in first-out (FIFO) buffer circuit coupled to the output and configured to store a number of error vectors; and the extractor circuit configured to provide at least one of the error vectors at an output of the FIFO buffer circuit based on an indicator.

17. A method comprising:

receiving, at a data channel, input data;

applying, at the data channel, an error correction operation to the input data to produce corrected data, the corrected data being a corrected version of the input data output from the error correction operation;

generating, by an extractor circuit, a random value using the input data and the corrected data as a source of entropy;

generating, by a random number generator, a random number based on the random value; and generating, by an encryption key generator, one or more encryption keys based on the random number.

18. The method of claim 17 further comprising the generating, by the extractor circuit, the random value using the input data and the corrected data as the source of entropy including:

generating an error vector based on the input data and the corrected data; and generating the random value based on the error vector.

19. The method of claim 18 further comprising:

generating the error vector by performing an XOR logical function on the input data and the corrected data to produce the error vector as an output of the XOR logical function.

20. The method of claim 18 further comprising the generating, by the extractor circuit, the random value using the input data and the corrected data as the source of entropy further including:
    generating multiple error vectors based on multiple input data and multiple corrected data; and
    generating the random value based on more than one error vector of the multiple error vectors.

* * * * *